United States Patent Office 3,351,637
Patented Nov. 7, 1967

3,351,637
12,20-DIMETHYL-Δ⁴-PREGNENE-3,20-DIONE STEROIDS AND DERIVATIVES THEREOF
Mariano A. Guiducci, Edison, and Nancy C. Kraemer, Cranford, N.J., assignors to E. R. Squibb & Sons, Inc., New York, N.Y., a corporation of Delaware
No Drawing. Filed Apr. 25, 1966, Ser. No. 544,700
4 Claims. (Cl. 260—397.1)

This invention relates to the synthesis of steroids, and has for its object the provision of a new class of physiologically active steroids, which may be represented by the formula

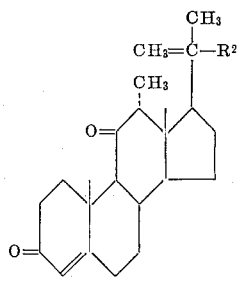

wherein $R^2$ is selected from the group consisting of hydroxyalkoxy, acyloxyalkoxy and carboxyalkoxy.

The preferred acyl radicals of this invention are those of hydrocarbon carboxylic acids of less than twelve carbon atoms, as exemplified by the lower alkanoic acids (e.g., acetic, propionic, butyric and tert-pentanoic acids), the lower alkenoic acids, the monocyclic aryl carboxylic acids (e.g., benzoic and toluic acids), the monocyclic aryl lower alkanoic acids (e.g., phenylacetic and β-phenylpropionic acids), the cycloalkane carboxylic and the cycloalkene carboxylic acids.

The compounds of the invention are useful as antibacterial agents. They can be administered in a range of 0.1 mg. to 100 mg. per kg. of patient weight. But generally it is preferred to administer the compounds of this invention in a manner known to the art. Thus, the novel compounds of this invention may be formulated for such administration, the concentration and/or dosage being based on the activity of the particular compound and the requirements of the patient.

The starting material 9α-fluoro-11-ketoprogesterone-3,20-bisethylene ketal is reacted with methyl magnesium bromide and thereafter hydrolyzed with an acid such as dilute hydrochloric to yield 12α,20ξ-dimethyl-20ξ-(2′-hydroxyethoxy)-pregn-4-ene-3,11-dione.

This intermediate may then be treated with an acid anhydride in the presence of an organic base such as pyridine to form the acyloxy compounds of the instant invention. Further, oxidation of the alcohol with an oxidizing agent such as chromic acid yields the acid derivative of this invention, 12α,20ξ-dimethyl-20ξ-(carboxymethoxy)-pregn-4-ene-3,11-dione.

EXAMPLE 1

12α,20ξ-dimethyl-20ξ-(2′-hydroxyethoxy)-
pregn-4-ene-3,11-dione

The crude product (32 g.) from the reaction of 9α-fluoro-11-ketoprogesterone - 3,20 - bisethylene ketal with methyl magnesium bromide and subsequent acid hydrolysis as clearly described in U.S. Patent No. 2,970,143 is chromatographed on 1 kg. of Merck acid-washed alumina. Elution with benzene-chloroform (2/1) afforded 2 g. of 12α,20ξ-dimethyl-20ξ-(2′-hydroxyethoxy)-pregn-4-ene-3,11-dione. Recrystallization from acetone-hexane yields 200 mg. of fine needles with the following physical properties: M.P. 166–167° C., $[\alpha]_D^{22°}$ +129° (CHCl₃, c. 1.00) λ alc., max. 238 mμ (15,400); λ CHCl₃, max. 3590, 1706 and 1678 cm.⁻¹; λ Nujol, max. 2.82, 5.9, 6.02, 6.2, 8.62, 9.1 and 9.3μ; NMR (CDCl₃) methyl singlets at 9.14, 8.82, 8.79 and 8.59τ; methyl doublet at 8.86τ, methylene multiplets centered at 6.36 and 6.56τ and vinyl proton at 4.3τ.

Analysis.—Calc'd for C₂₆H₃₈O₄ (412): C, 74.59; H, 9.52. Found: C, 74.89; H, 9.82.

EXAMPLE 2

12α,20ξ-dimethyl-20ξ-(2′-acetoxy-ethoxy)-
pregn-4-ene-3,11-dione

To 88 mg. of the product of Example 1 is added 2 ml. of pyridine and 1 ml. of acetic anhydride. After the reaction mixture is stirred at room temperature for twenty hours, ice is added and the resultant precipitate is filtered and washed thoroughly with water to yield 74 mg. of the product with a M.P. 110–112° C. Recrystallization from aqueous ethanol yields fine needles with the following physical characteristics: M.P. 112–113° C., $[\alpha]_D^{22°}$ +130° (CHCl₃, c. 1.02), λ alc., max. 238 mμ (ε 15,200), λ Nujol, max. 5.75, 5.92, 6.00, 6.20, 8.10, 8.62, 9.05, 9.42 and 11.5μ.

EXAMPLE 3

12α,20-dimethyl-20-(2-carboxymethoxy)-
pregn-4-ene-3,11-dione

To a solution of 320 mg. of the product of Example 1 dissolved in 10 ml. of KMnO₄ treated acetone is added fifteen drops of 8 N chromic acid solution. After the reaction is stirred for one hour, isopropyl alcohol is added to destroy the excess oxidizing reagent and the mixture is concentrated to remove the solvents. After addition of water, the mixture is extracted with chloroform and the combined chloroform extract worked with water, dried over sodium sulfate and concentrated to dryness to yield 304 mg. of product. Recrystallization from acetone-hexane yields prisms, M.P. 174–175° C., $[\alpha]_D^{22°}$ +144° (CHCl₃, c. 1.02); λ alc., max. 240 mμ (ε=16,400), λ Nujol, max. 5.85, 5.95, 6.18, 8.24, 8.66, 8.8, 9.1, 10.55 and 11.42μ.

The invention may be variously otherwise embodied within the scope of the appended claims.

What is claimed is:
1. A compound having the formula

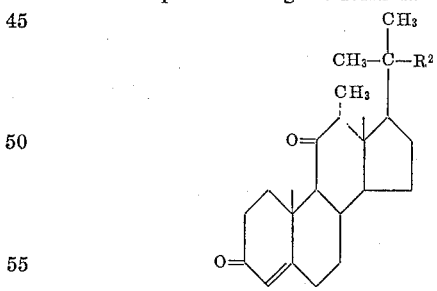

wherein $R^2$ is selected from the group consisting of hydroxyalkoxy, acyloxyalkoxy and carboxyalkoxy.

2. A compound in accordance with claim 1 having the name 12α,20ξ-dimethyl-20ξ-(2′-hydroxyethoxy)-pregn-4-ene-3,11-dione.

3. A compound in accordance with claim 1 having the name 12α,20ξ-dimethyl-20ξ-(2′-acetoxy-ethoxy)-pregn-4-ene-3,11-dione.

4. A compound in accordance with claim 1 having the name 12α,20ξ-dimethyl-20ξ-(2′-carboxymethoxy)-pregn-4-ene-3,11-dione.

References Cited
UNITED STATES PATENTS
2,941,996   6/1960   Christensen et al. -- 260—239.55

E. L. ROBERTS, Primary Examiner.